United States Patent [19]

Cristiani et al.

[11] Patent Number: 4,834,295

[45] Date of Patent: May 30, 1989

[54] FUEL ATOMISATION AND METERING VALVE FOR A FUEL INJECTION DEVICE OF AN INTERNAL COMBUSTION ENGINE

[75] Inventors: Marcello Cristiani, Imola; Nicola Martoccia, Bologna, both of Italy

[73] Assignee: Weber S.r.l., Turin, Italy

[21] Appl. No.: 197,709

[22] Filed: May 23, 1988

[30] Foreign Application Priority Data

Jun. 9, 1987 [IT] Italy .............................. 67495 A/87

[51] Int. Cl.4 .............................................. F16K 31/06

[52] U.S. Cl. ............................... 239/585; 251/129.15; 251/129.22

[58] Field of Search ........................ 137/797; 239/585; 251/129.15, 129.22; 335/255

[56] References Cited

U.S. PATENT DOCUMENTS

| | | | |
|---|---|---|---|
| 4,660,770 | 4/1987 | Gieseking | 239/585 |
| 4,678,124 | 7/1987 | Hafner et al. | 239/585 |
| 4,700,891 | 10/1987 | Hans et al. | 239/585 X |
| 4,711,400 | 12/1987 | Radaelli et al. | 239/585 |
| 4,725,041 | 2/1988 | Chauvin et al. | 239/585 X |
| 4,756,331 | 7/1988 | Stegmaier | 251/129.15 X |

FOREIGN PATENT DOCUMENTS

| | | | |
|---|---|---|---|
| 0186323 | 7/1986 | European Pat. Off. . | |
| 6179859 | 4/1986 | Japan | 239/585 |
| 220310 | 3/1925 | United Kingdom . | |
| 954210 | 4/1964 | United Kingdom . | |
| 2058467 | 4/1981 | United Kingdom . | |
| 2113299 | 8/1983 | United Kingdom . | |

*Primary Examiner*—Gerald A. Michalsky
*Attorney, Agent, or Firm*—Albert L. Jeffers

[57] ABSTRACT

The valve comprises a casing, a shutter member axially movable within it, a core of magnetic material also disposed within the casing, an armature fixed to the shutter member and an excitation winding disposed within a cavity of annular form defined between the casing, the core and the armature; a predetermined clearance is left between the surfaces which delimit the excitation winding and the surfaces of the said cavity in such a way as to form channels for the passage of fuel to allow this to wash completely over the surfaces which delimit the excitation winding.

4 Claims, 2 Drawing Sheets

FUEL ATOMISATION AND METERING VALVE FOR A FUEL INJECTION DEVICE OF AN INTERNAL COMBUSTION ENGINE

BACKGROUND OF THE INVENTION

The present invention relates to an electromagnetically actuated fuel atomisation and metering valve intended to be utilized on a fuel injection device of an internal combustion engine, which has very reduced dimensions, can be mounted in a simple and rapid manner, be extremely reliable and have very short response times to activation signals.

As is known valves of this type normally include a casing, a shutter member movable axially within the interior of this, from a first position in which it opens the fuel injection passage formed in the forward end of the casing itself, to a second position in which it closes this passage, a core of magnetic material disposed within the interior of the casing and an armature fixed to the shutter member, as well as an excitation winding of annular form for generating a magnetic field in the core to attract the armature and carry the shutter member into the previously defined first position.

The said core is normally fixed to the upper end of the casing utilizing connection members of various types and sealing rings are also disposed between the former and the latter for preventing the escape of fuel from the valve casing.

The shutter member is normally held in the previously defined first position by the action of a coil spring housed within an axial bore in the core and one end of which rests on a stop member fixed to the core itself; this stop member, which can be one of various types, is also normally axially adjustable in position with respect to the core for the purpose of being able to vary the force exerted by the said spring on the shutter member.

Valves of the type briefly described have various disadvantages.

First of all, the operating characteristics of the valve can vary in use because of an excessive heating of the excitation winding: in fact, it can be completely drawn into the interior of a cavity in the casing and the fuel exerts a very modest cooling action on it because of the small surface of the winding which is exposed to the washing action of the fuel itself.

Moreover, the time required for the shutter member to move from one to the other of its two previously defined positions can be rather long because of the large magnetic inertia of various parts of the valve, in particular the core; the mass of this is rather large because of the form and dimensions which are necessary for fixing it to the end of the casting and due to the presence of the auxiliary members necessary to effect connection between the parts and to ensure a fuel tight seal between the casting and the core. Consequently, therefore, the overall dimensions of the valve are rather large.

Finally, the operations necessary for assembly of the valve are neither rapid nor easy since the various members of which it is constituted must be mounted from both ends of the casing and, moreover, a rigorous regulation of the axial position of the first defined stop member must be effected during the course of the assembly. In order to achieve this regulation it is necessary that the stop member and the other subsidiary members which are necessary to define the said axial position be accessible from the upper end of the valve, with consequent restrictions on the form and dimensions of this upper part.

SUMMARY OF THE INVENTION

The object of the present invention is that of providing a valve for metering and atomisation of fuel for a fuel injection device of an internal combustion engine of the type which has been described above and which will be free from the disadvantages which have been discussed.

This object is obtained by means of a fuel metering and atomisation valve for a fuel injection device of an internal combustion engine, comprising a casing, a shutter member axially movable within the said casing from a first position in which it opens a fuel injection passage formed in the forward end of the casing itself to a second position in which it closes this passage, a core of magnetic material disposed within the interior of the said casing, an armature fixed to the said shutter member, an excitation winding of annular form for generating a magnetic field in the said core to attract the said core and displace the shutter member to the said first position, the said winding being disposed within a cavity of annular form defined between the said casing and the said core and armature, and ducts for the fuel being formed within the interior of the said casing for putting a fuel inlet opening into communication with the said injection passage and with a fuel discharge opening, characterized by the fact that a predetermined clearance is left between the surfaces which delimit the said excitation winding and the surfaces of the said cavity in such a way as to form channels for the passage of fuel forming part of the said duct and which allow the said fuel completely to wash the said surfaces which delimit the said excitation winding.

BRIEF DESCRIPTION OF THE DRAWINGS

For a better understanding of the present invention a more detailed description will now be given by way of example with reference to the attached drawings, in which.

DETAILED DESCRIPTION OF THE INVENTION

Figure 1:
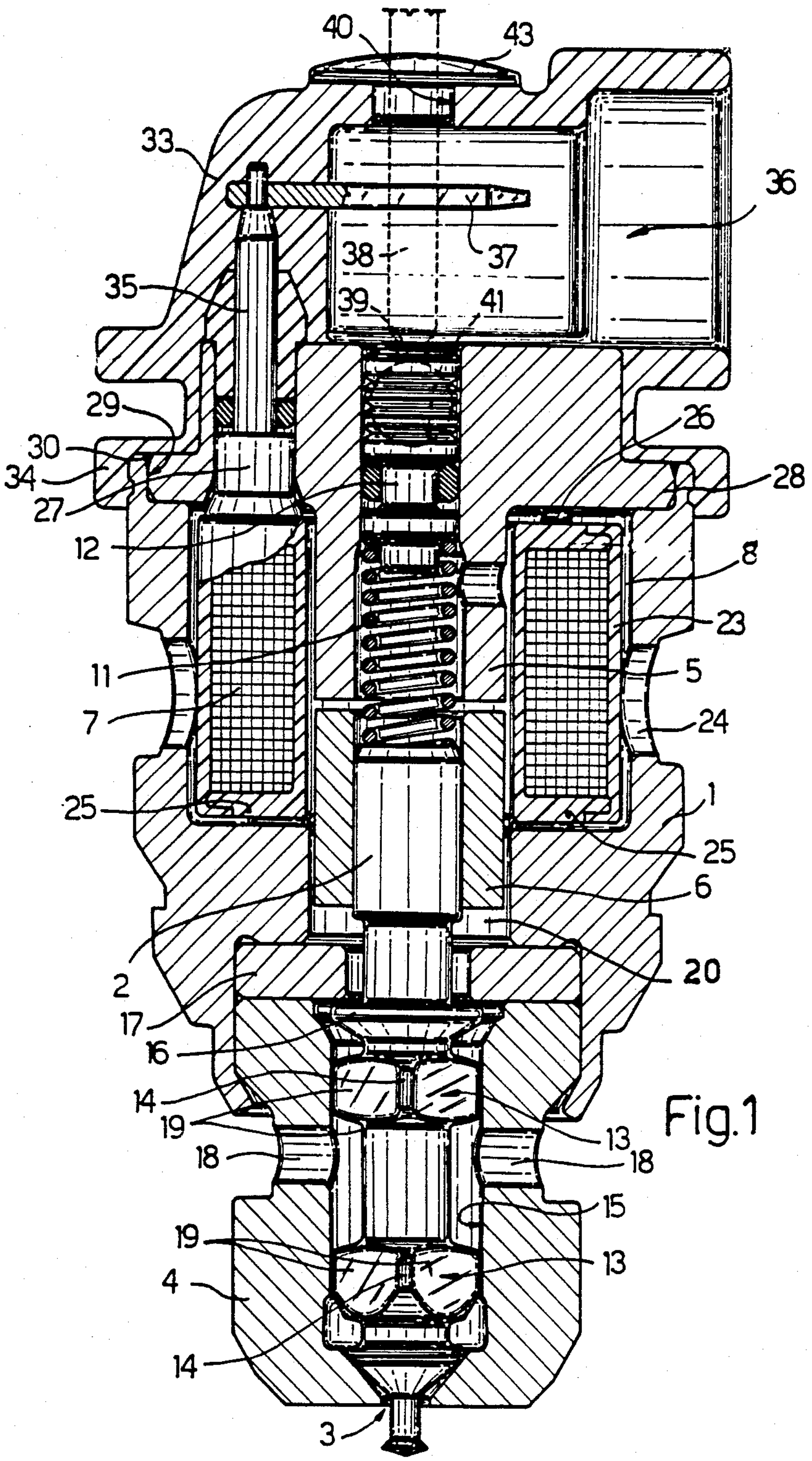
FIG. 1 is a longitudinal section through the valve of the invention.

The valve of the invention comprises a casing 1, a shutter member 2 movable axially within the interior of the casing from a first position 3 in which it opens the fuel injection passage formed in a nozzle 4 fixed to the forward end of this casing, to a second position, illustrated in FIG. 1, in which it closes this passage; the valve further includes a core 5 disposed within the interior of the casing, an armature 6 of tubular form fixed to the shutter member, and an excitation winding 7 of annular form for generating a magnetic field in the core 5 and in the parts adjacent to it, to attract the armature 6 and to displace the shutter member into the first open position. The winding 7 is housed within an annular cavity 8 defined between the casing 1, the core 5 and the armature 6. The shutter member 2 is normally held in the closure position, illustarted in FIG. 1, by the action of a coil spring 11 housed within an axial hole in the core 5 and one end of which rests on a stop member 12 inserted in the said axial hole and fixed with respect to the core in a manner which will be described hereinbelow.

Conveniently the forward part of the shutter member 2 is provided with a pair of annular projections 13 each of which has cylindrical surface portions 14 which rest on the inner cylindrical surface 15 of the nozzle 4 for the purpose of guiding the shutter member during its movement from one to the other of the two first defined positions.

The shutter member 2 is provided with a stop collar 16 able to engage against a stop ring 17.

A fuel inlet opening 18 is formed in the nozzle 4 and is in communication with the injection opening 3 and with a chamber 20 formed in the body 1 by means of ducts defined between the surfaces of the shutter member and the members adjacent to it, and in particular between the surface 15 of the nozzle 4 and the flat surfaces 19 formed on the annular projections 13.

According to the invention, between the surfaces which delimit the excitation winding 7, or between the surfaces of a casing 23 in which the winding itself is enclosed (as is the case in the embodiment illustrated), and the surfaces of the cavity 8 there is left a predetermined clearance in such a way as to define channels for the passage of fuel which puts the chamber 20 into communication with a fuel outlet opening 24 formed in the body 1; in this way the channels which are thus defined around the excitation winding 7 allow the fuel to wash completely over the surfaces which delimit the winding itself to carry away the thermal energy which is generated during activation of the winding itself.

The valve includes centering means for maintaining the excitation winding 7 coaxial with the axis of the cavity 8 and with the axis of the shutter member 2, which conveniently include the parts 25 which project from the lower surfaces of the casing 23 of the winding and the parts 26 which project from the upper surface or, also, other parts (not shown) projecting radially from the lateral surface of the said casing. Alternatively the centering means can comprise pins 27 which can be inserted into corresponding holes in an annular collar 28 of the core 5.

The annular collar 28 is fitted in a corresponding seat 29 of the casing 1 and is connected to this by means of a welding bead 30 conveniently formed by spots; over the assemby constituted by the casing 1, the core 5 and the excitation winding 7, there is fitted a cap 33 of plastics material provided with an annular rim 34 connected to the upper end of the body 1 outside the annular collar 28 and the welding bead 30 as is clearly seen in FIG. 1.

Figure 2:
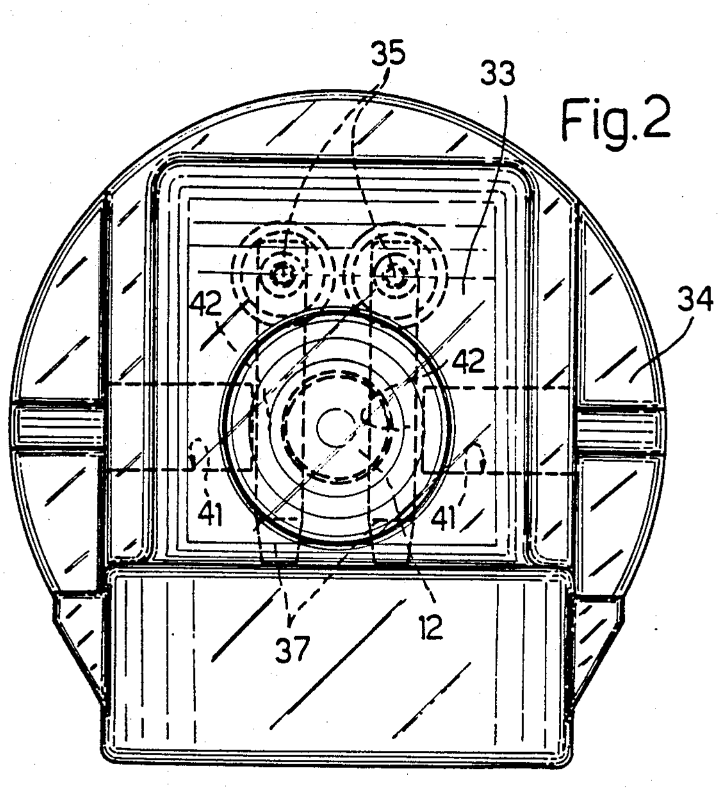
FIG. 2 is a plan view from above of the valve.

The excitation winding 7 is provided with a pair of electrical connectors 35 of cylindrical form projecting from the pins 27; the cap 33 is provided with a cavity 36 open to the exterior and having an axis substantially orthogonal to that of the shutter member 2, whilst the end of each of the connectors 35 is fitted into a hole of a corresponding conductive bar 37 projecting into the cavity 36; the ends of the connectors 35 and of the bar 37 at which the connection is made are embedded in the plastics material of the cap 33 as is clearly seen in FIG. 1. Each bar 37 is disposed in the cavity 36 to one side of the axis of the shutter member and a predetermined distance from it as is clearly seen in FIG. 2.

The stop member 12 is provided with a shaft 38 formed integrally therewith and separated from it by a zone 39 having sections of smaller mechanical strength than that of the main section of the shaft itself, whilst the cap 33 is provided with a hole 40 able to allow the shaft to pass through it; this is prearranged in order axially to position the stop member 12 which is connected to the interior of the axial hole of the core 5 and to be separable from the member itself in a manner which will be described, by means of breakage in the region 39 after the stop member has been fixed to the core.

Figure 3:
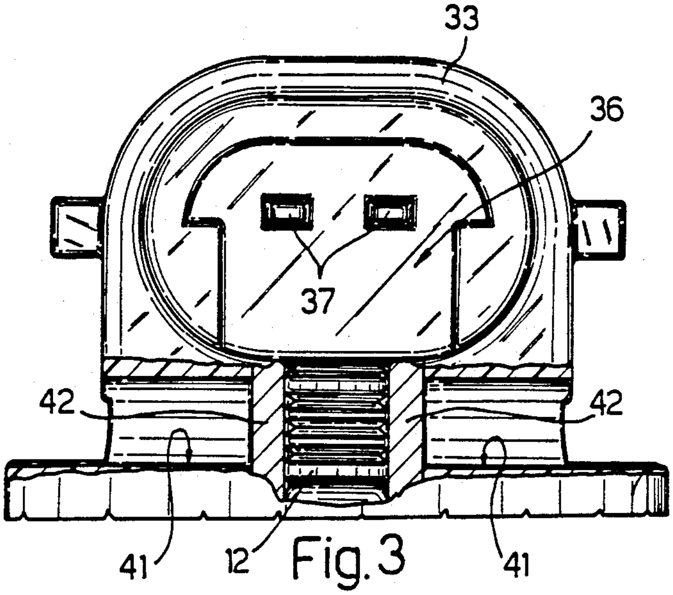
FIG. 3 is a partially sectioned side view of the upper part of the valve.

The cap 33 is provided, as is clearly seen in FIG. 3, with a pair of holes 41 the axes of which are orthogonal to that of the shutter member 2, and which can be traversed by a tool provided for plastically deforming the material of the core in the region of the zone 42 (FIG. 3) to fix the stop member with respect to the core.

The assembly and operation of the valve described takes place in the following manner.

First of all the excitation winding is inserted into the interior of the cavity 8 of the casing 1 and the core 5 is fixed to the casing itself by means of the welding bead 30 after the collar 28 has been inserted into the corresponding seat 29; in this way a single assembly comprising the casing 1, the core 5, the excitation winding 7 with the parts associated with it, in particular the bars 37 is obtained: the cap 33 is fitted over this assembly, which due to the fact that it is made from a plastics material can be formed directly on this assembly by means of an injection moulding operation by introducing the assembly itself into the interior of a mould cavity.

Subsequently the other parts of the valve can be mounted, which are inserted into the casing 1 by introducing them from the lower end of this: therefore, first the stop member 12 will be mounted, the rod 38 of which is inserted into the cavity 36 between the bars 37 and projects from the hole 40 of the cap 33; subsequently the other parts can be introduced, the spring 11, the shutter member 2 with the armature 6, the ring 17 and, finally, the nozzle 4; at this point inspection of the valve and adjustment of the axial position of the stop member 12 can take place: during this operation this is brought into the correct position by acting on the rod 38 and, when this is achieved, the stop member is fixed in position by introducing into the holes 41 (FIG. 3) suitable tools which serve plastically to deform the material of the zone 42 to fix the stop member with respect to the core. At this point the rod 38 can be separated from the stop member 12 by exerting, for example, a torsion on it, in such a way as to break the zone 39 of least strength; the hole 40 can conveniently be closed by a plug 43.

The valve described operates in the same manner as valves of the same type: the difference, however is that there is a more effective cooling of the excitation winding 7 because of the fuel duct which is created around this winding and which completely surrounds the surface of the winding itself to remove thermal energy from it; the fuel which traverses this duct flows out through the hole 24.

The time taken to move the shutter member from one to the other of the two operative positions to open or close the injection hole 3 is very small because of the low magnetic inertia of the valve and, in particular, of the core 5: consequently, therefore, the valve is extremely responsive. This favourable characteristic depends on the low mass of the parts made of magnetic material, in particular the core 5, and the parts contiguous to it; such a reduction in mass is a consequence of the manner of connection between the collar 28 and the casing 1 and between the rim 34 of the cap 33 and the casing itself.

It is also evident that the assembly and adjustment operations of the valve can be performed in a simple and rapid manner both because a single assembly comprising the casing 1, the excitation winding 7, the core 5 and the cap 33 can be initally prepared, in which these parts are already stably connected together, and the other parts subsequently assembled by introducing them from the lower end of the casing 1. Finally, the operation for adjustment of the axial position of the stop member 12 and fixing it with respect to the core 4 can be performed by means of a few simple operations.

The dimensions of the valve obtained are small and its reliability is very high.

It is evident that the form and description of the various parts of the valve which has been described can have modifications and variations introduced thereto without departing from the ambit of the invention.

We claim:

1. A fuel metering and atomization valve for a fuel injection device of an internal combustion engine, comprising a casing, shutter member axially movable along a shutter member axis within said casing from a first position, in which it opens a passage to a fuel injection hole formed in a forward end of said casing itself, to a second position in which it closes this passage, a core of magnetic material provided with an annular collar and disposed within said casing, an armature fixed to said shutter member, an excitation winding of annular form for generating a magnetic field in said core to attract said armature and displace said shutter member to said first position, said winding being provided with a pair of pin-type electrical connectors and being disposed within a cavity of annular form defined between said casing and said core and armature, and a cap of plastic material provided with an annular rim connected to an upper end of said casing, said shutter member biased towards said second position by a spring, one end of said spring resting against a stop member, said stop member placed in a first hole in said core, said first hole being coaxial with said shutter member axis, said cap including an externally open cavity having an axis substantially orthogonal to said shutter member axis, the depth of said cavity being such that its bottom wall extends beyond said shutter member axis, said cap also having at least one second hole having an axis substantially orthogonal to said shutter member axis, the depth of said second hole being such that its bottom wall comprises said casing, each of said connectors being disposed in a hole in a corresponding straight conductive bar and projecting into said cavity beyond said shutter member axis, respective ends of said connectors and of said bars being connected together and embedded in said cap, said stop member forming a movable end wall of an elongated cavity of said casing, said stop member also separating said shutter member from said externally open cavity by a region having smaller mechanical strength than the remaining sections of said stop member, said cap being provided with a third hole for access to said elongated cavity, said elongated cavity configured for axially positioning said stop member within said first hole in said core whereby said stop member, by means of breaking said region after affixation of said stop member to said core, and said cap allow for a tool to traverse said second hole and plastically deform material of said core so as to fix said stop member with respect to said core.

2. A valve according to claim 1, characterized by the fact that the said annular collar (28) of the said core is fitted into a corresponding seat (29) of the said casing and is connected to this by a fluid-tight seal (30), and over the assembly consitiuted by the casing, the core and the excitation winding fitted in the said cavity there is fitted said cap (33) of plastics material provided with an annular rim (34) connected to the upper end of the said casing and externally of the said annular collar of the said core and the said fluid-tight seal.

3. A valve according to claim 1, characterized by the fact that each of the said bars (37) is disposed in the said cavity to one side of the said axis of the shutter member and at a predetermind distance from the said axis.

4. A valve according to claim 1, characterized by the fact that the said cap is provided with a pair of said holes (41) disposed on opposite sides of the said stop member.

* * * * *